United States Patent [19]
Sharma et al.

[11] Patent Number: 5,944,843
[45] Date of Patent: Aug. 31, 1999

[54] METHOD AND APPARATUS FOR USING THE UNUSED BITS OF A DATA PACKET TO TRANSMIT ADDITIONAL INFORMATION

[75] Inventors: Debendra Das Sharma, Roseville; John A. Wickeraad, Loomis, both of Calif.

[73] Assignee: Hewlett-Packard Company, Palo Alto, Calif.

[21] Appl. No.: 08/918,696

[22] Filed: Aug. 21, 1997

[51] Int. Cl.$^6$ .................................................. G06F 11/00
[52] U.S. Cl. ........................................ 714/701; 714/746
[58] Field of Search .................................. 371/2.1, 20.1, 371/30, 35, 37.01, 41, 37.02, 67.1, 68.2; 395/183.02, 183.19, 182.08, 182.16, 182.19, 182.02, 185.09; 364/265.1, 266.3, 269.4, 944.5, 945.6, 946.1; 714/701, 712, 746, 751, 752, 774, 753, 819, 821, 27, 43, 56, 10, 18, 21

[56] References Cited

U.S. PATENT DOCUMENTS

| | | | |
|---|---|---|---|
| 4,480,307 | 10/1984 | Budde et al. | 364/200 |
| 5,051,999 | 9/1991 | Erhart et al. | 371/41 |
| 5,164,944 | 11/1992 | Benton et al. | 371/40.1 |
| 5,544,179 | 8/1996 | Hartwell | 371/47.1 |
| 5,608,738 | 3/1997 | Matsushita | 371/37.1 |

*Primary Examiner*—Trinh L. Tu
*Attorney, Agent, or Firm*—David A. Plettner

[57] ABSTRACT

A method and apparatus in accordance with the present invention uses the unused bits of a data packet to transmit additional information by piggy-backing "secondary" code words into a data packet containing a "primary" code word. A secondary code word may be piggy-backed into a data packet containing a primary code word when the primary code word and any secondary code words already stored in the data packet leave sufficient unused space in the data packet to store an additional secondary code word, and the route traveled by the data packet as the packet is routed to the network node addressed by the primary code passes through (or ends at) the network node addressed by the secondary code word, or passes through (or ends at) a network node that can relay the secondary code word to the network node addressed by the secondary code word. In a first embodiment, an ECC is generated for the primary code word using a predefined bit pattern (such as all 0's) for any unused bit positions in the data packet. The same predefined bit pattern is used for the unused bit positions when the integrity of the primary code word is verified at the destination. If it is desired to protect the secondary code word, a secondary ECC must also be stored in the data packet. In a second embodiment, the ECC is recalculated when a secondary code word is piggy-backed into the unused bit positions of the data packet. In this embodiment, the ECC associated with the data packet protects all data in the packet, including the primary and secondary code words.

19 Claims, 13 Drawing Sheets

METHOD AND APPARATUS FOR USING THE UNUSED BITS OF A DATA PACKET TO TRANSMIT ADDITIONAL INFORMATION

FIELD OF THE INVENTION

The present invention relates to packet-based networked communications. More specifically, the present invention relates to a communication system wherein unused bits of a packet are used to transmit additional information.

DESCRIPTION OF THE RELATED ART

In the field of computing and communications, it is common to transmit data over a packet-based network using a packet having a defined size. Often, the data transmitted in a packet does not use all the bit positions defined in the packet.

It is also common in the field of computing to protect the integrity of a data packet by associating an error correcting code (ECC) with the data packet. One common ECC code is the "single error correction—double error detection" (SEC-DEC) Hamming code, which is capable of correcting a single bit error in the packet, and detecting two bit errors in the packet. As is known in the art, a SEC-DEC hamming code transforms the data bits to incorporate detection and correction capabilities into the data packet, and also includes separate check bits. A less sophisticated error detection technique uses parity bits to detect bit errors in the packet.

Typically, ECC codes are generated for all bit positions in a packet, even if all bit positions are not used to carry data. Therefore, the whole packet is "locked up" by the ECC code, and bit positions that would otherwise be available for carrying data cannot be used without destroying the ability of the ECC to verify the integrity of the data stored in the packet.

SUMMARY OF THE INVENTION

The present invention is a method and apparatus for using the unused bits of a data packet to transmit additional information by piggy-backing "secondary" code words into the unused space of a data packet in which is stored a "primary" code word that does not use all bit positions provided by the data packet. The conditions under which a secondary code word may be piggy-backed are: 1) the primary code word leaves sufficient unused space in the data packet to store at least one secondary code word; and 2) the route traveled by the data packet as the packet is routed to the network node addressed by the primary code word passes through (or ends at) the network node addressed by the secondary code word, or passes through (or ends at) a network node that can relay the secondary code word to the network node addressed by the secondary code word.

In a first embodiment of the invention, when the ECC is generated for a primary code word, a predefined bit pattern (such as all 0's) is used for any unused bit positions in the data packet. When the primary code word is received at the destination node, the destination node determines which bits are unused based on the primary code word type, and the predefined bit pattern is used to calculate the ECC, even though the unused bits may not actually contain the predefined bit pattern. In this embodiment, the ECC associated with the data packet only protects the primary code word. If it is desired to protect the secondary code word with an ECC, a separate ECC protecting the secondary code word must be included in the unused bit positions of the data packet.

In a second embodiment, the ECC is recalculated when a secondary code word is piggybacked into the unused pit positions of the data packet. In this embodiment, the ECC associated with the data packet protects all data in the packet, including the primary and secondary code words.

DETAILED DESCRIPTION OF THE PREFERRED EMBODIMENTS

Figure 1:
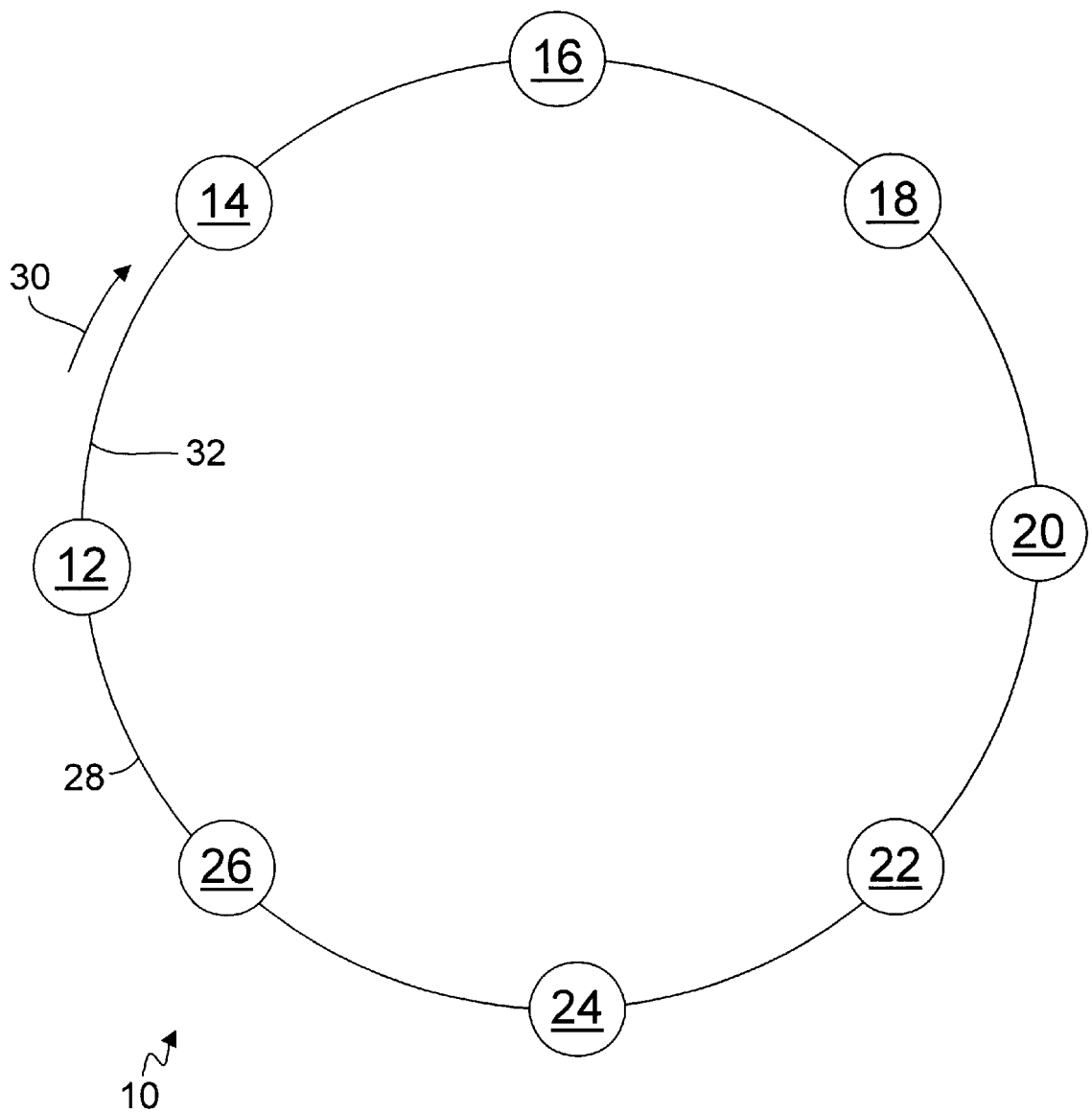
FIG. 1 is a block diagram of a networked system.

The present invention is a method and apparatus for using the spare bits of a data packet to transmit additional information. The present invention will be illustrated by way of a block diagram of networked system 10, as shown in FIG. 1.

Networked system 10 includes network nodes 12, 14, 16, 18, 20, 22, 24, and 26. Each network node is coupled to adjacent nodes by a network segments, such as network segment 28 connecting node 26 to node 12 and network segment 32 connecting node 12 to node 14. Data packets flow between network nodes in a single clockwise direction, as indicated by arrow 30. As used herein, the term "data packet" will be used to refer to a data structure in which data is carried from node to node. In contrast, the term "code word" will be used to refer to information carried by the data packet.

In the art of computing, the term "code word" is often used to include both data and any associated error correction and detection bits. However, as used herein, the term "code word" denotes the actual user or system data, exclusive of any associated error correction of detection bits.

Networked system 10 represents any type of system having nodes connected by network segments. For example, the nodes of networked system 10 may represent a computer network having computer workstations, printers, servers, and the like. Alternatively, the networked system 10 may be a multiprocessor system wherein individual central processing units (CPUs) are coupled together via a network. The present invention will be illustrated with reference to networked system 10, but those skilled in the art will recognize that the present invention may be adapted to a variety of network topologies, such as a star topology, or a linked cluster topology.

Figure 2:
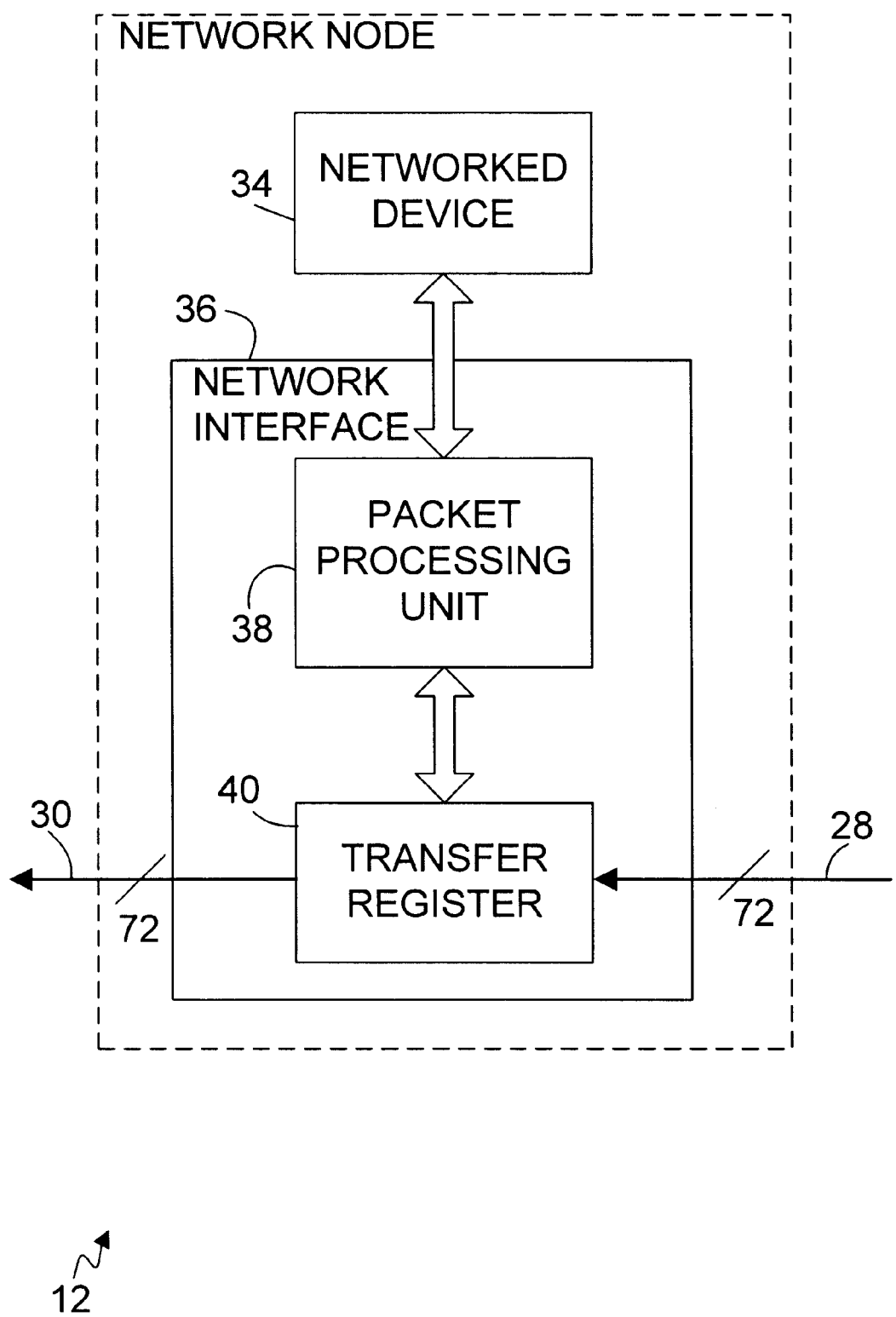
FIG. 2 is a block diagram illustrating a network node from the networked system of FIG. 1.

FIG. 2 is a block diagram illustrating network node 12 of FIG. 1. The following discussion of node 12 is applicable to all network nodes of networked system 10. Network node 12 includes a networked device 34 and a network interface 36, which is coupled to device 34. Network interface 36 includes packet processing unit 38 and transfer register 40. Networked device 34 may any type of device coupled to a network, such as a computer workstation, a printer, a server, and the like. In addition, networked device 34 may represent central processing units (CPUs) in a multiprocessor system.

Network segments 28 and 30, along with the other network segments in FIG. 1, are each 72 bit busses that are coupled to transfer register 40. A synchronous network clock causes data from one network node to be clocked into the next network. Accordingly, the network transfers 72 bits in parallel into each transfer register every network clock cycle. Sixty-four of these bits carry a data packet, and the other eight bits carry the check bits of an error correcting code (ECC), such as a SEC-DED Hamming code, that protects the data packet.

Packet processing unit 38 is coupled between networked device 34 and transfer register 40. Packet processing unit transfers data from networked device 34 to transfer register 40 when networked device 34 sends data over the network, and transfers data from transfer register 40 to networked device 34 when a data packet containing a code word addressed to node 12 is received in register 34. Unit 38 also generates an error-correcting code (ECC) for outbound data, and verifies inbound data based on the ECC received with the inbound data. Finally, packet processing unit 38 regulates the flow of outbound data based on whether transfer register 40 may accept a data packet.

Figure 3:
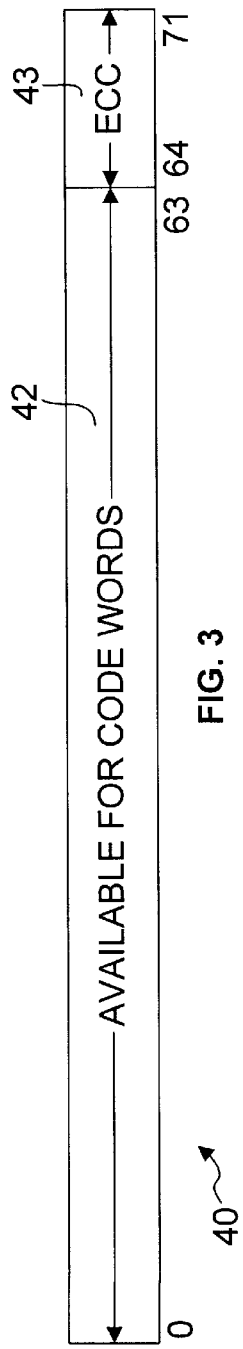
FIG. 3 shows the format of a transfer register that is part of the network node of FIG. 2.

FIG. 3 shows the format of register 40. Bit positions 0–63 hold data packet 42. Various types of code word may be transmitted within packet 42. The code words may include information such as the source and destination nodes of the packet, header information, acknowledge information, data content, and the like. Bit positions 64–71 of register 40 are used to hold data packet ECC 43, which is used to verify the integrity of the data stored in bit positions 0–63.

Often, a block of data that needs to be transferred from one node to another is larger than the size of data packet 42. Accordingly, a transmission protocol is used to transmit the block of data. For example, a typical transmission protocol define a series of code words, such as a header code word, followed by at least one data content code word, and ending with an acknowledge code word.

Figure 4:
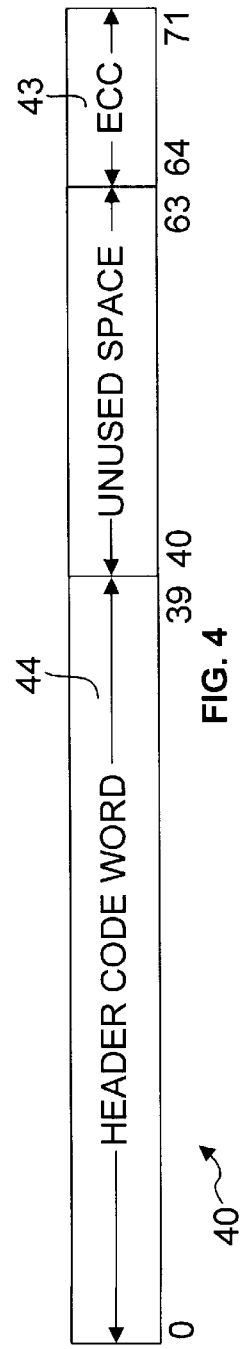
FIG. 4 shows a typical header code stored in the transfer register shown in FIG. 3.

For example, FIG. 4 shows a typical header code word 44 stored in register 40. Header code word 44 may contain information such as the source node, the destination node, the number of data content packets that will follow, and any other information required by the protocol. Typically, header code words do not use all the bit positions available in the packet. For example, header code word 44 uses bit positions 0–39, thereby leaving bit positions 40–63 unused. As discussed above, ECC code 43 protects the data packet, which includes header code word 44 in FIG. 4.

Figure 5:
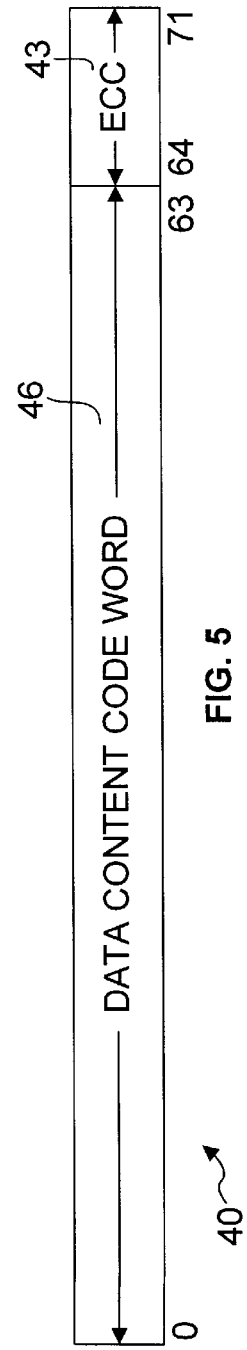
FIG. 5 shows a typical data content code word stored in the transfer register shown in FIG. 3.

FIG. 5 shows a data content code word 46. Typically, a data content code word will use all bit positions of a data packet, with the possible exception of the last data content code word in a series of data content code words.

Many transmission protocols require that the receiving node transmit an acknowledge code word back to the sending node to acknowledge that the receiving node has correctly received all information. Similar to a header code word, an acknowledge code word also typically does not use all the bit positions available in the data packet.

The present invention provides for "secondary" code words to be piggy-backed into the unused space of a data packet in which is stored a "primary" code word. Many types of code words may be transmitted as secondary code words, such as an acknowledge code word or code words carrying various types of control information, such as queue status information or flow control information. The conditions under which the secondary code word may be piggy-backed are:

1) The primary code word leaves sufficient unused space in the data packet to store at least one secondary code word (including a secondary packet ECC, if provided as discussed below); and 2) The route traveled by the data packet as the packet is routed to the network node addressed by the primary code must also pass through (or end at) the network node addressed by the secondary code word, or passes through (or ends at) a network node that can relay the secondary code word to the network node addressed by the secondary code word.

By analogy, the secondary code word is like a hitchhiker that asks the driver of a car whether he or she is going in the direction the hitchhiker wishes to travel. If the driver is, the hitchhiker gets in the car and rides with the driver until the hitchhiker gets to his or her destination. If the driver does not go all the way to the hitchhiker's destination, then the hitchhiker goes as far as the driver, gets out, and waits for another car that will move the hitchhiker closer to his or her destination.

With reference to FIG. 1, assume that node 18 is sending a primary code word to node 24, and the primary code word does not use all bit positions of the data packet, as is the case with header code word 44 in FIG. 4. Assume further that node 20 needs to send a code word to node 22, and the code word will fit into the unused space left by the primary code word sent by node 18. When the data packet reaches node 20, node 20 recognizes that the data packet will travel past node 22 and that there is room to hold the code word that node 20 seeks to send. Accordingly, node 20 piggybacks its code word into the packet as a secondary code word. When the data packet reaches node 22, node 22 recognizes that the data packet contains a secondary code word addressed to it and extracts the secondary code word from the data packet. The data packet then travels on to node 24, where the primary code word is extracted by node 24.

One novel feature of the present invention is the manner in which ECCs are generated and verified for both the primary and secondary code words. In a first embodiment, when the ECC is generated for a primary code word, a predefined bit pattern (such as all 0's) is used for any unused bit positions in the data packet. When the primary code word is received at the destination node, the destination node determines which bits are unused based on the type of the primary code word, and the predefined bit pattern is used to verify the ECC, even though the unused bits may not actually contain the predefined bit pattern. In this embodiment, the ECC associated with the data packet only protects the primary code word. If it is desired to protect the secondary code word with an ECC, a separate ECC protecting the secondary code word must be included in the unused pit positions of the data packet.

In a second embodiment, the ECC is recalculated when a secondary code word is piggybacked into the unused pit positions of the data packet. In this embodiment, the ECC associated with the data packet protects all data in the packet, including the primary and secondary code words.

Figure 6:
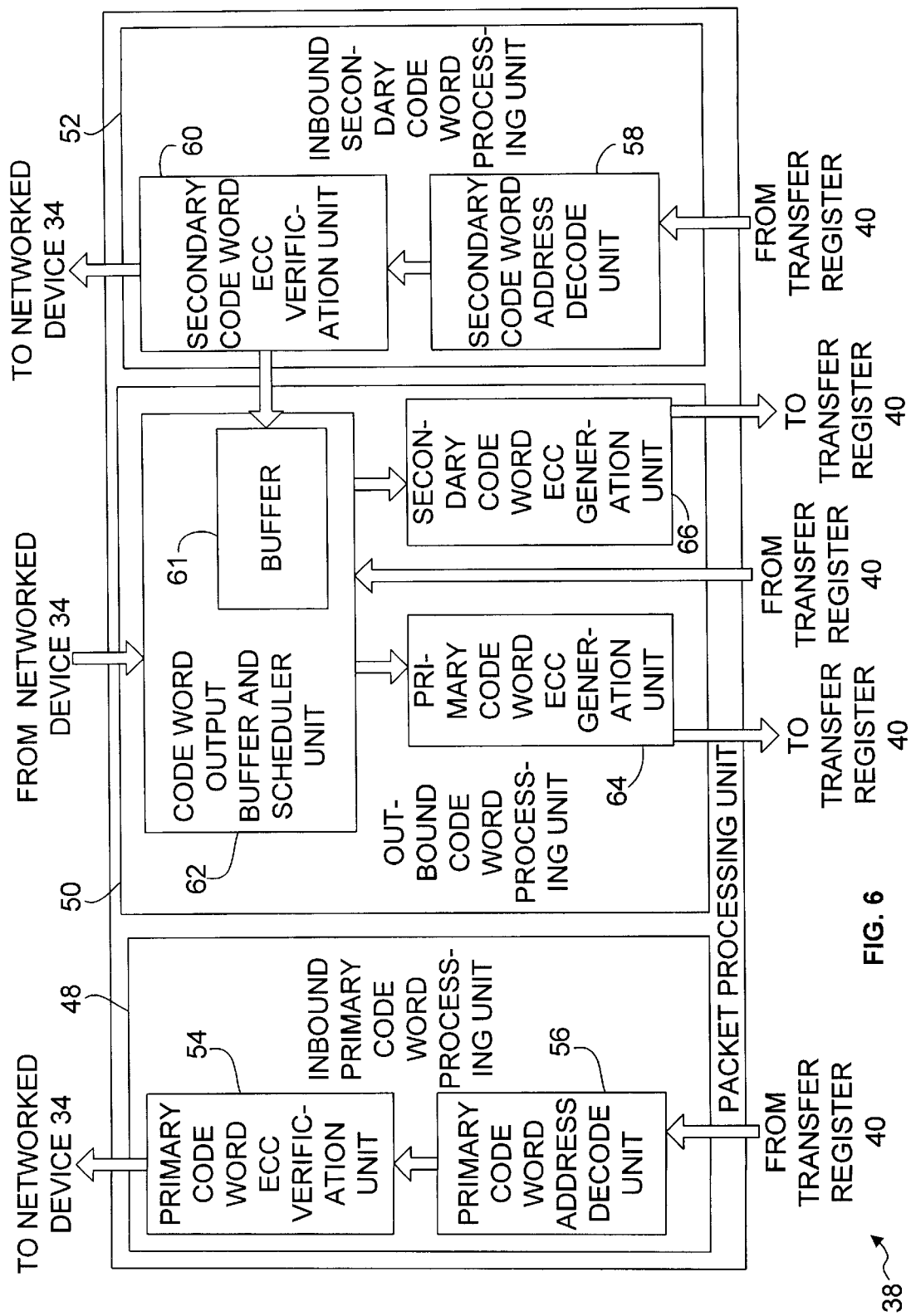
FIG. 6 is a block diagram of packet processing unit in accordance the present invention.

FIG. 6 is a block diagram of packet processing unit 38 in accordance with both embodiments of the present invention. Packet processing unit 38 includes inbound primary code word processing unit 48, outbound code word processing unit 50, and inbound secondary code word processing unit 52. Inbound primary code word processing unit 48 includes a primary code word address decode unit 56 arranged to receive data from transfer register 40 of FIG. 2, and primary code word ECC verification unit 54 arranged to receive data from primary code word address decode unit 56 and to provide data to networked device 34 of FIG. 2. Similarly, inbound secondary code word processing unit 52 includes a secondary code word address decode unit 58 arranged to receive data from transfer register 40, and secondary code word ECC verification unit 60 arranged to receive data from secondary code word address decode unit 58 and to provide data to networked device 34 or to buffer 61 of code word output buffer and scheduler unit 62 of outbound code word processing unit 50.

Outbound code word processing unit 50 includes code word output buffer and scheduler unit 62, primary code word ECC generation unit 64, and secondary code word ECC generation unit 66. Unit 62 includes buffer 61. Primary code word ECC generation unit 64 is arranged to receive code words from code word output buffer and scheduler unit 62 and to provide primary code words with ECCs to transfer register 40. Similarly, secondary code word ECC generation unit 66 is arranged to receive code words from code word output buffer and scheduler unit 62 and to provide secondary code words to transfer register 40. In the first embodiment described above, unit 60 may also generate an ECC protecting only the secondary code word. In the second embodiment described above, unit 60 recalculates the ECC associated with the data packet to include the piggy-backed secondary code word.

Code word output buffer and scheduler unit 62 is arranged to receive data from networked device 34 and provide data to primary code word ECC generation unit 64 and secondary code word ECC generation unit 66. Code word output buffer and scheduler unit 62 is also arranged to observe transfer register 40 to determine whether register 40 may accept a primary code word, a secondary code word, or both.

In the example above, a primary code word was transmitted from node 18 to node 24 in FIG. 1, while a secondary code word was transmitted from node 20 to node 22 by piggy-backing the secondary code word into the same data packet as the primary code word. The following discussion will describe how the example given above is realized in the first embodiment of the present invention.

When node 18 seeks to send a code word, such as header code word 44 in FIG. 4, the networked device 34 of node 18 transmits the code word to code word output buffer and scheduler unit 62 of outbound code word processing unit 50 of packet processing unit 38. Typically, a protocol will define a flag (or some other mechanism) in the data packet to indicate whether the packet contains a code word. For the sake of this discussion, assume that the first bit of the data packet is defined as a "primary code word present" flag and is set to indicate that the packet contains a primary code word, and is clear to indicate that the packet does not contain a primary code word. Further assume that when the data packet contains a primary code word that does not use all bit positions of the data packet, the first unused bit is defined as a "first secondary code word present" flag and is set to indicate that the packet contains a first secondary code word, and is clear to indicate that the packet does not contain a first secondary code word. If a second secondary code word is present in the data packet, the first bit not used by the primary and first secondary code words is defined as a "second secondary code word present" flag. In a similar manner additional "nth secondary code word present" flags may be defined as needed.

Code word output buffer and scheduler unit 62 monitors transfer register 40 and determines when register 40 is able to accept a code word by waiting for a data packet that has its "primary code word present" flag clear. When an available data packet is identified, primary code word ECC generation unit 64 generates the ECC code that protects the packet and the code word and ECC are stored in the data packet in transfer register 40. Note that in this embodiment, the ECC is generated using a fixed bit pattern (such as all 0's) for any bit positions not used by the primary code word.

The next network clock cycle will transfer the contents of transfer register 40 of node 18 to transfer register 40 of node 20. In this example, node 20 is seeking to transmit a code word (such as an acknowledge code word) that may be transmitted as a secondary code word. The code word is transferred from networked device 34 to code word output buffer and scheduler unit 62. Unit 62 monitors transfer register 40 and detects that register 40 contains a primary code that does not use all bits available in the data packet. To perform this function, unit 62 must be capable of determining that the primary code word does not use all bits in the data packet. This may be done by using a lookup table to match the type of primary code word with the number of bits used by the primary code word, by using a predefined bit pattern in the data packet to indicate the number of unused bits, or any other method suitable for use with a network architecture and protocol in which the present invention is to be implemented.

After unit 62 has determined that the code word may be piggy-backed into the data packet in register 40 as a secondary code word, unit 62 transfers the code word to secondary code word ECC generation unit 66. Unit 66 generates an ECC based on the code word, and inserts the code word and ECC into the packet stored in register 40.

It is also within the scope of the first embodiment of the present invention for both unit 64 and 66 to generate ECCs for respective code words before a data packet is received in transfer register 40. In such a configuration, unit 62 cooperates with units 64 and 66 to generate the ECCs before a data packet arrives. When the data packet arrives in register 40, the code words, along with the pre-calculated ECCs are ready to be transferred into register 40.

Figure 7:
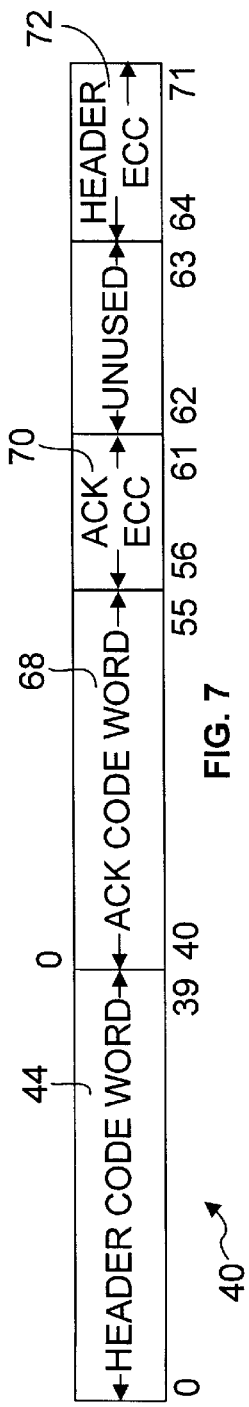
FIG. 7 shows the contents of a transfer register after primary and secondary code words have been stored in the transfer register in accordance with a first embodiment of the present invention.

FIG. 7 shows the contents of register 40 after primary and secondary code words have been stored in register 40 in accordance with the first embodiment of the present invention. In FIG. 7, header code word 44 is the primary code word and is stored in bit positions 0–39, and acknowledge code word 68 is the secondary code word and is stored in bit positions 40–55. Acknowledge ECC 70 is stored in bit positions 56–61 and protects acknowledge code word 68 (the secondary code word). Header ECC 72 is stored in bit positions 64–71 and protects header code word 44 (the primary code word). Bit positions 62 and 63 are unused.

At the next network clock cycle, the contents of register 40 of node 20 will transfer to register 40 of node 22. Once again, in this example node 22 is not sending data and the secondary code word in register 40 is addressed to node 22. Primary code word address decode unit 56 examines the data packet stored in register 40 and determines that register 40 does not contain a primary code word addressed to node 22. Secondary code word address decode unit 58 examines the data packet stored in register 40 and determines that register 40 contains a primary code word, and therefore may also contain a piggy-backed secondary code word. Unit 58 then determines that register 40 contains a secondary code word addressed to node 22, and extracts the secondary code word (along with a secondary ECC, if present) from register 22. Secondary code word ECC verification unit 60 verifies the integrity of the secondary code word based on the secondary ECC, and sends the secondary code word to networked device 34.

At the next network clock cycle, the data packet is transferred to register 40 of node 24. Primary code word address decode unit 56 determines that the packet in register 40 contains a primary code word addressed to node 24. Unit 56 extracts the primary code word and the data packet ECC. Primary code word verification unit 54 verifies the integrity of the primary code word by calculating an ECC based on the primary code word and a fixed bit pattern (such as all 0's) for any bit positions not used by the primary code word, and comparing the calculated ECC with the ECC retrieved from register 40. The primary code word is then transmitted to networked device 34.

In the discussion above, the first embodiment of the present invention was explained by way of example. Below, the first embodiment of the present invention will be explained by way of several flow charts that explain the functions performed by the various units in FIG. 6.

Figure 8:
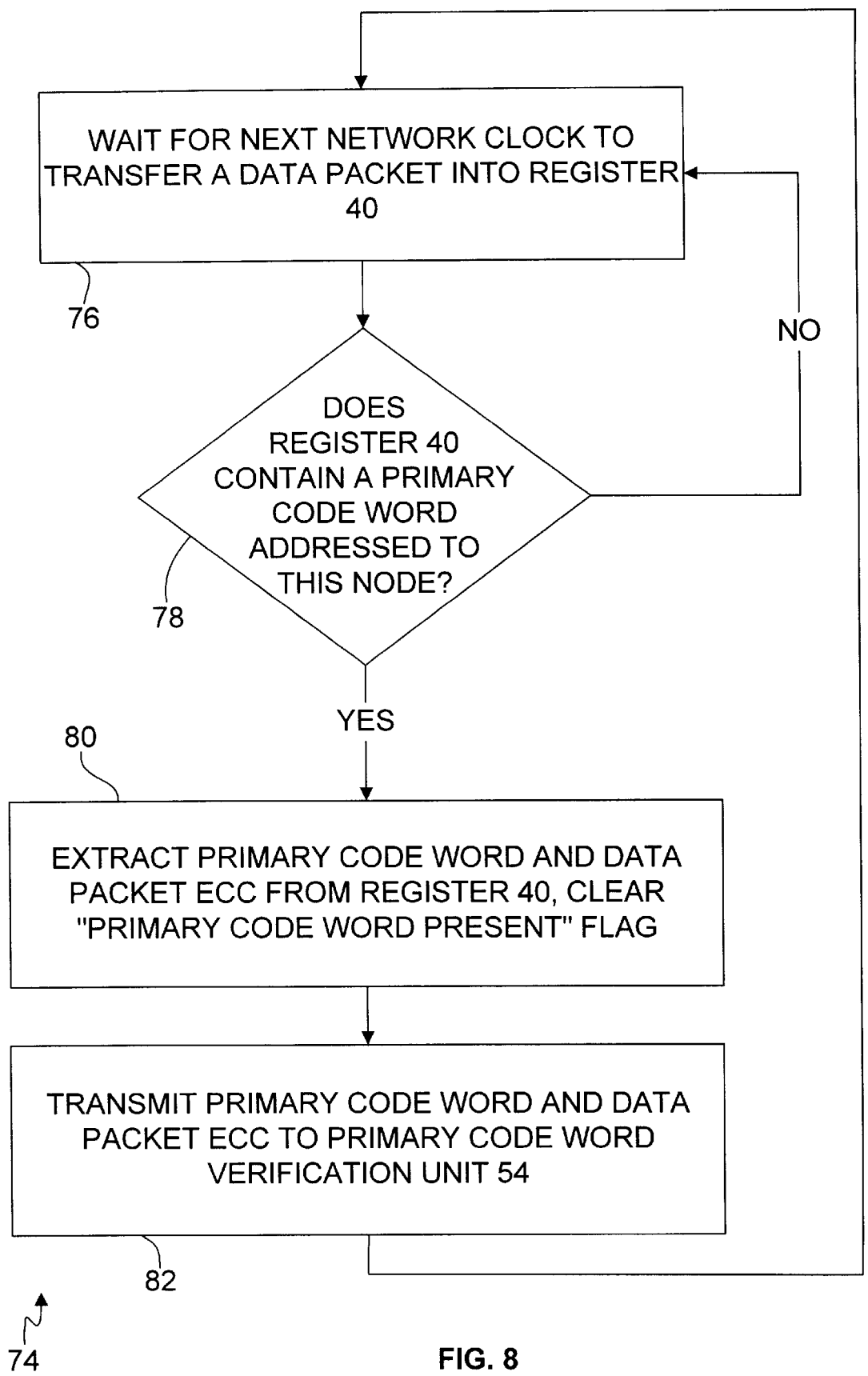
FIG. 8 is a flow chart illustrating the functions performed by a primary code word address decode unit that is shown in FIG. 6.

FIG. 8 is a flow chart 74 illustrating the functions performed by primary code word address decode unit 56. Block 76 waits for the next network clock cycle to transfer a data packet into register 40. After a data packet arrives, decision block 78 determines whether register 40 contains a primary code word addressed to this node by examining the "primary code word present" flag and the destination address of the primary code word (if present). If register 40 does not contain a primary code word, the "NO" branch is taken back to block 76. If it does, the "YES" block is taken to block 80.

Block 80 extracts the primary code word and data packet ECC from register 40, clears the "primary code word present flag", and passes control to block 82. Block 82 transmits the primary code word and data packet ECC to primary code word ECC verification unit 54 and transfers control back to block 76.

Figure 9:
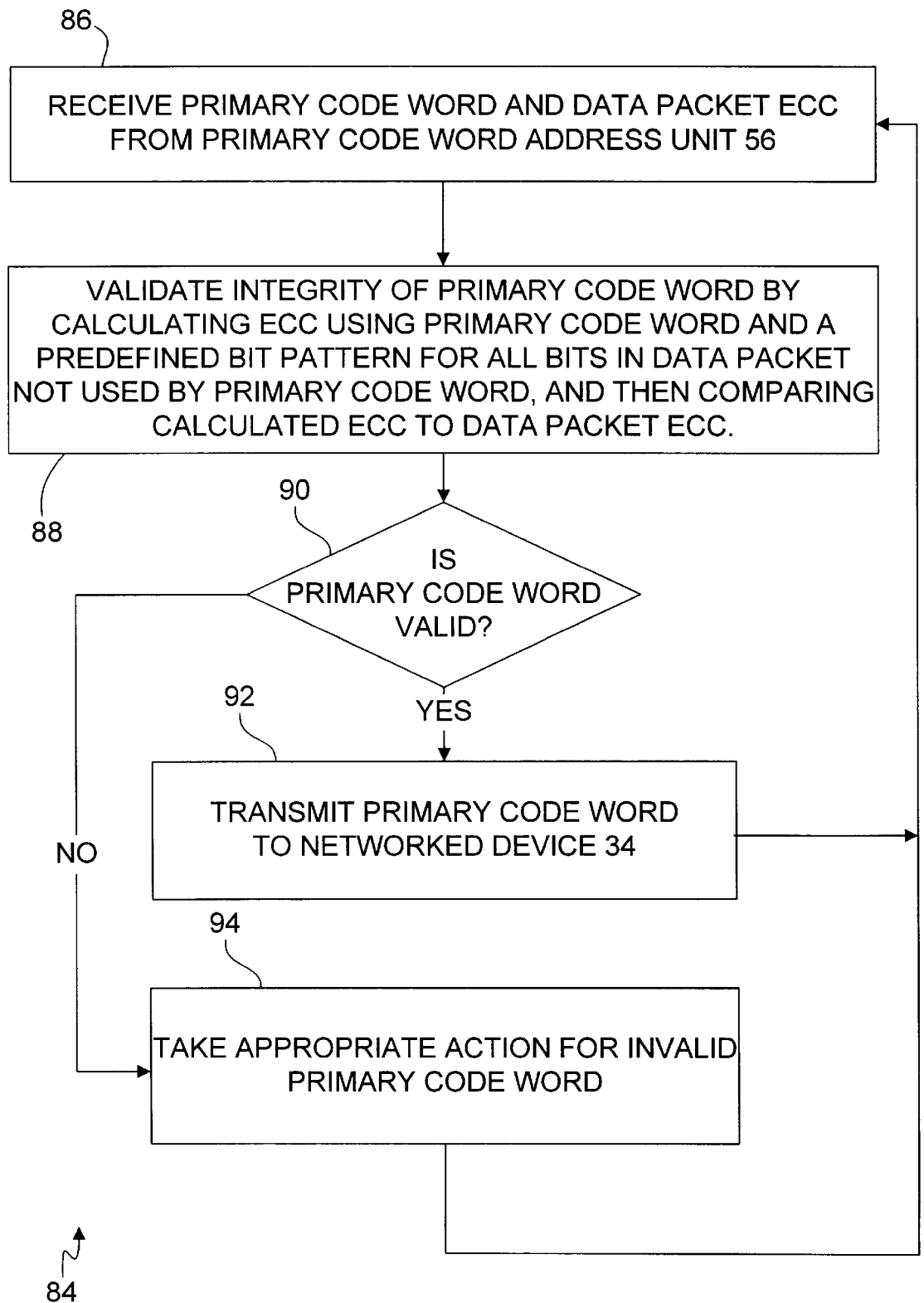
FIG. 9 is a flow chart illustrating the functions performed by a primary code word verification unit that is shown in FIG. 6.

FIG. 9 is a flow chart 84 illustrating the functions performed by primary code word verification unit 54. At block 86, unit 54 receives the primary code word and data packet ECC from unit 56. At block 88 the integrity of the primary code word is verified by calculating an ECC using the primary code word and a predefined bit pattern for all bits in the data packet that are not used by the primary code word, and then comparing the calculated ECC to the data packet ECC. Control then passes to decision block 90, which determines whether the packet is valid.

If the packet is valid, the "YES" branch is taken to block 92, which transfers the primary code word to networked device 34 and transfers control back to block 86. If the packet is invalid, the "NO" branch is taken to block 94. Block 94 takes an action appropriate for an invalid code word, such as requesting retransmission of the packet, signaling network device 34 that an error has occurred, or any other response known in the art. If the error is of a type that may be corrected based on the data packet ECC, block 94 can also correct the error and transmit the corrected primary code word to device 34. Block 94 then passed control back to block 86.

Figure 10:
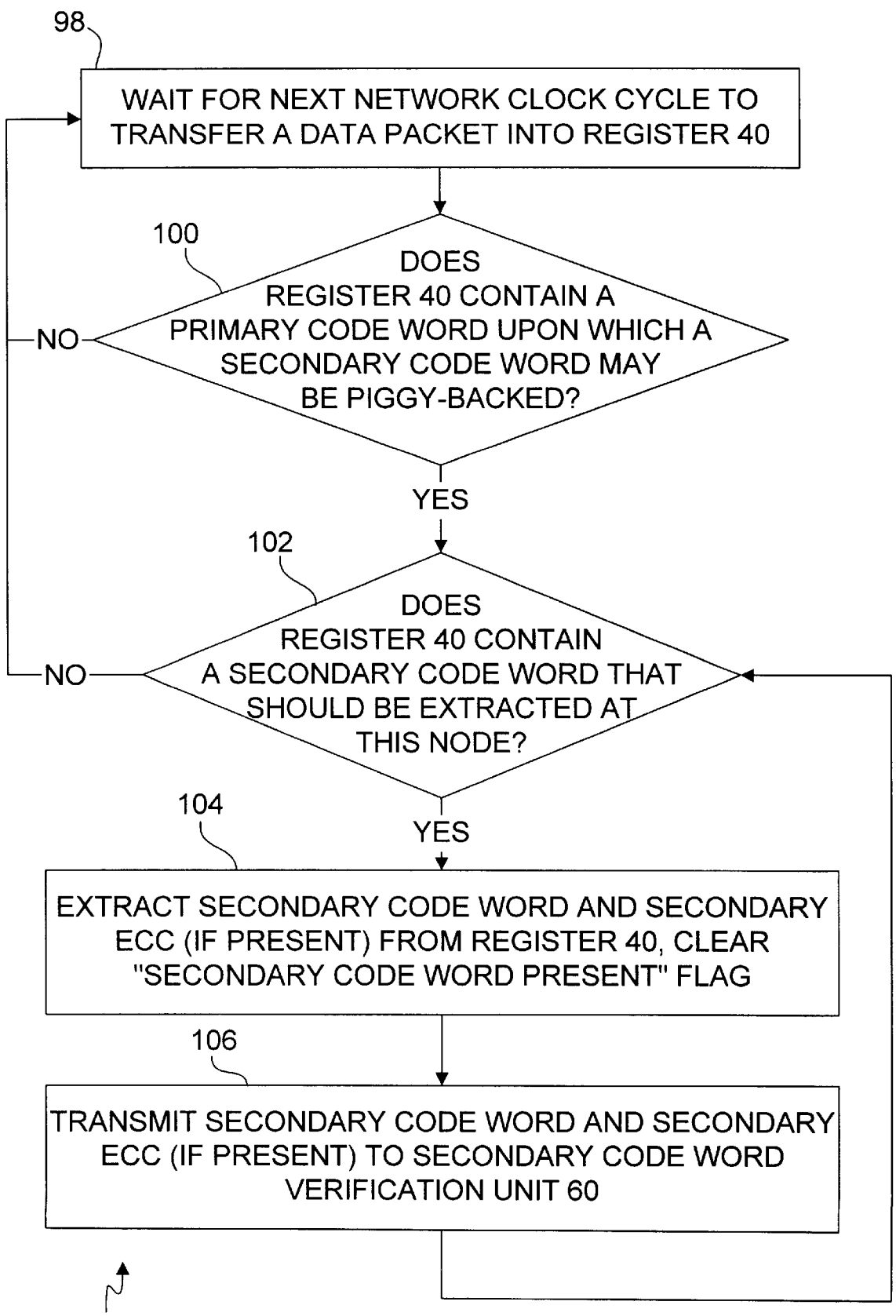
FIG. 10 is a flow chart illustrating the functions performed by a secondary code word address decode unit that is shown in FIG. 6.

FIG. 10 is a flow chart 96 illustrating the functions performed by secondary code word address decode unit 58. Block 98 waits for the next network clock cycle to transfer a data packet into register 40. After a data packet arrives, decision block 100 determines whether register 40 contains a primary code word upon which one or more secondary code word may be piggy-backed. If it does not, the "NO" branch is taken back to block 98. If it does, the "YES" block is taken to decision block 102.

Decision block 102 determines whether register 40 contains one or more secondary code words that should be extracted from packet 40 at this node by examining the "secondary code word present" flag and the destination address of the first secondary code word (if present). If no secondary code word is present, the "NO" branch is taken back to block 98. If a secondary code word is present, the "YES" branch is taken to block 104.

Note that if the primary code word is addressed to this node, but the address of the secondary code word indicates that the secondary code word should travel further, the secondary code word must be extracted so that it may by piggy-backed a subsequent primary code word. In a slightly different configuration, which will be described in greater detail below, it may be desirable to always remove secondary code words at each node, and transmit them to outbound code word processing unit 50 if they are not addressed to the node.

Block 104 extracts the secondary code word and secondary ECC (if provided) from register 40, clears the "secondary code word present" flag, and passes control to block 106. Note that it is within the scope of the present invention to transmit a secondary packet without including a secondary ECC. Not transmitting a secondary ECC might be advantages in situations where it is desirable to maximize the amount of non-critical data that can be sent as secondary packets. Block 106 transmits the secondary code word and secondary ECC to secondary code word verification unit 60 and transfers control back to block 102.

Block 102 then looks for a second secondary code word. If one is found, blocks 104 and 106 are repeated, and block 102 looks for a third secondary code word. This process repeats until the packet contains no secondary packets that should be extracted at this node, at which point the "NO" branch is taken to block 98.

Note that if a first secondary code word is extracted from register 40, but register 40, but other secondary code word remains in register 40 and will not be extracted at this node, there may be two or more areas of unused space in register 40. Accordingly, it may be desirable to re-pack the remaining secondary code words to provide a single area of unused space. Re-packing may also be necessary to preserve the "nth secondary code word present" flag definitions discussed above.

Figure 11:
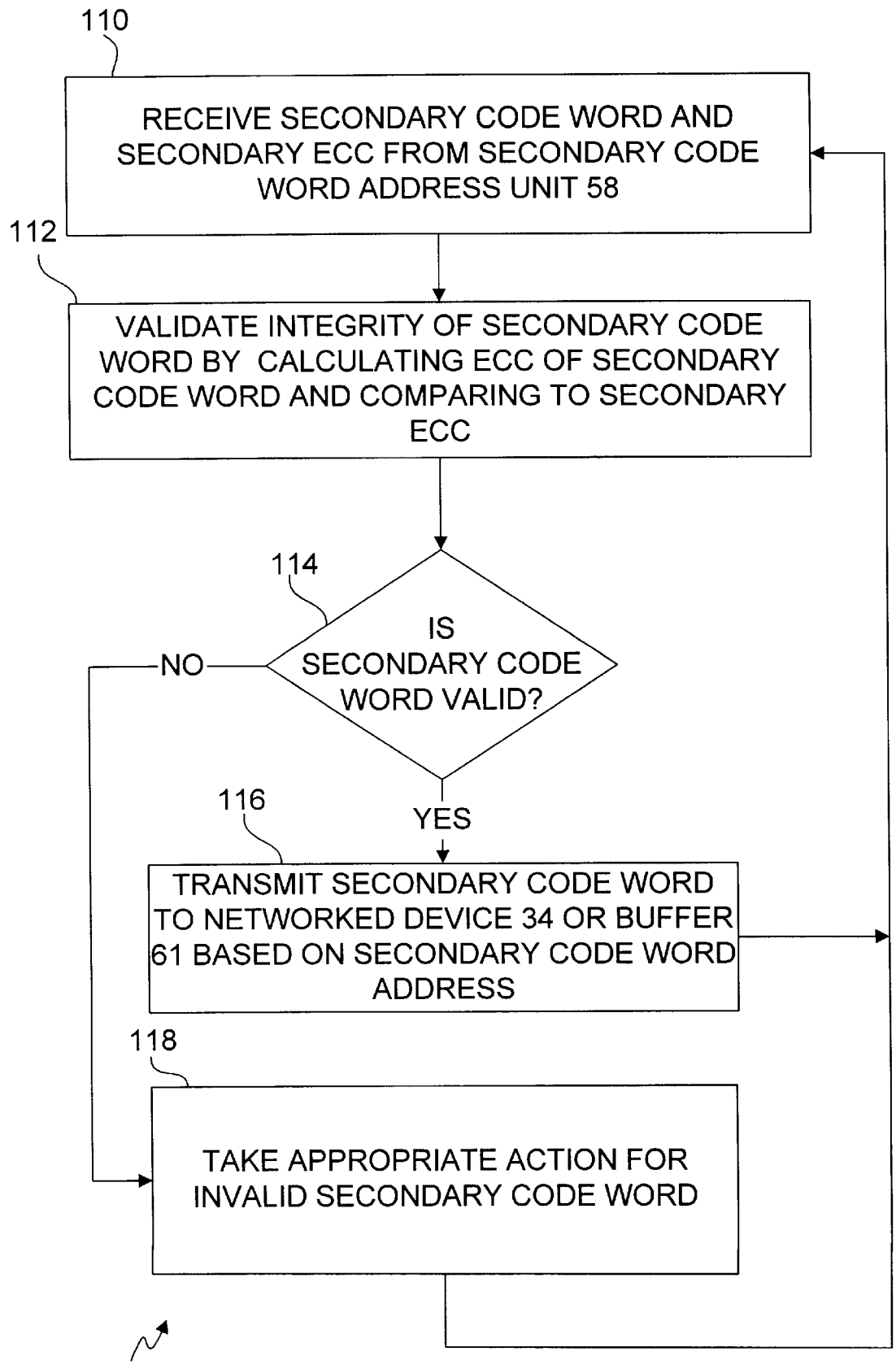
FIG. 11 is a flow chart illustrating the functions performed by a secondary code word verification unit that is shown in FIG. 6.

FIG. 11 is a flow chart 108 illustrating the functions performed by secondary code word verification unit 60. If the present invention is implemented without a secondary ECC, then the secondary code word will be provided directly to either networked device 34 or buffer 61 without performing the functions shown in FIG. 11.

At block 110, unit 60 receives the secondary code word and the secondary ECC from unit 58. At block 112 the integrity of the secondary code word is verified by calculating an ECC based on the secondary code word, and then comparing the calculated ECC to the secondary ECC. Control then passes to decision block 114, which determines whether the packet is valid.

If the packet is valid, the "YES" branch is taken to block 116, which transfers the secondary code word to either networked device 34 if the secondary code word is addressed to this node or to buffer 61 if the secondary code word is not addressed to this node. Control then passes back to block 110.

If the packet is invalid, the "NO" branch is taken to block 118. Block 118 takes an action appropriate for an invalid code word, such as requesting retransmission of the packet, signaling network device 34 that an error has occurred, or any other response known in the art. If the error is of a type that may be corrected based on the data packet ECC, block 118 can also correct the error and transmit the corrected secondary code word to device 34. Block 118 then passed control back to block 110.

Figure 12A:
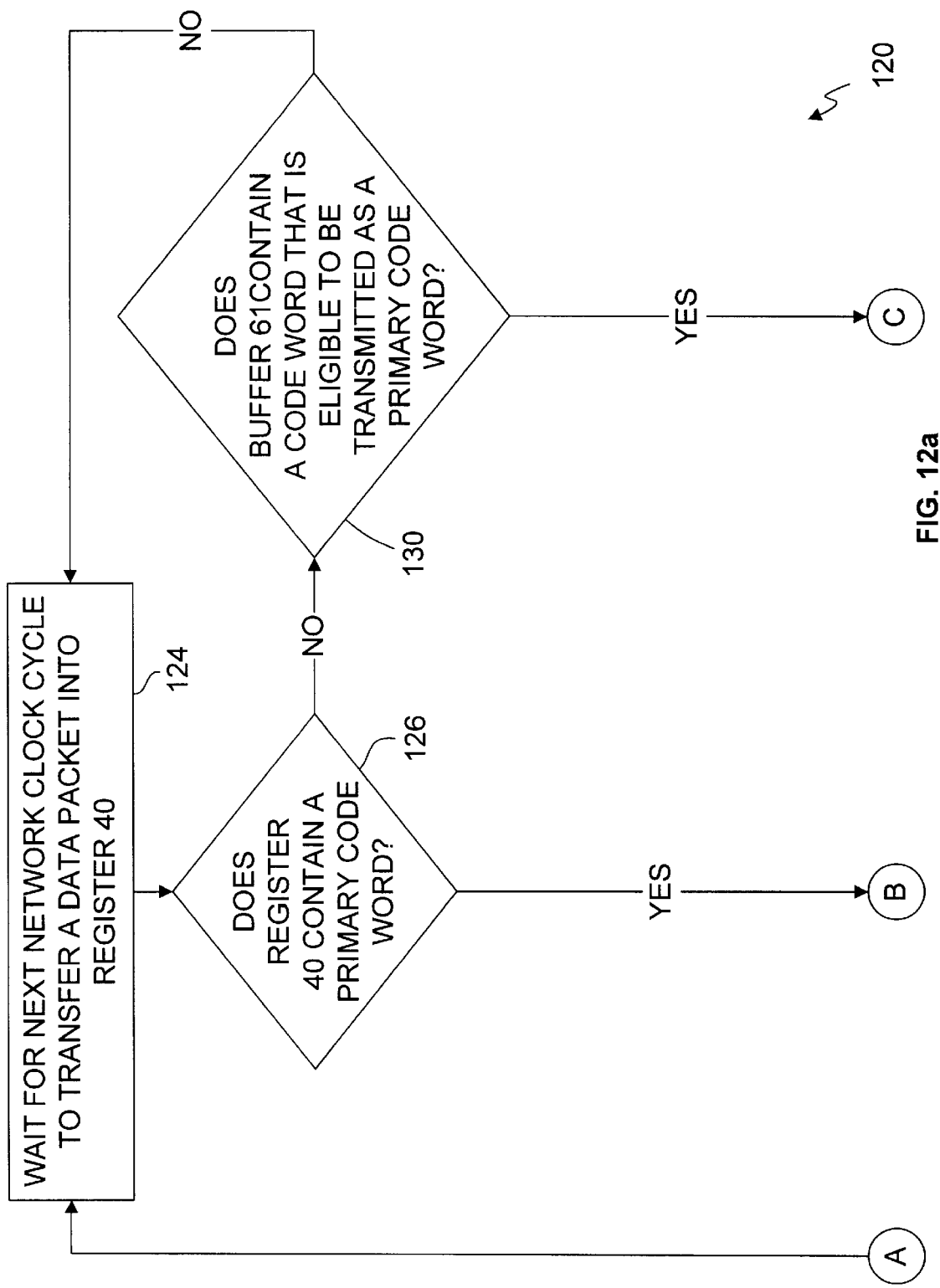
FIG. 12a–12c, taken collectively, show a flow chart illustrating the functions performed by an outbound code word processing unit that is shown in FIG. 6.
Figure 12B:
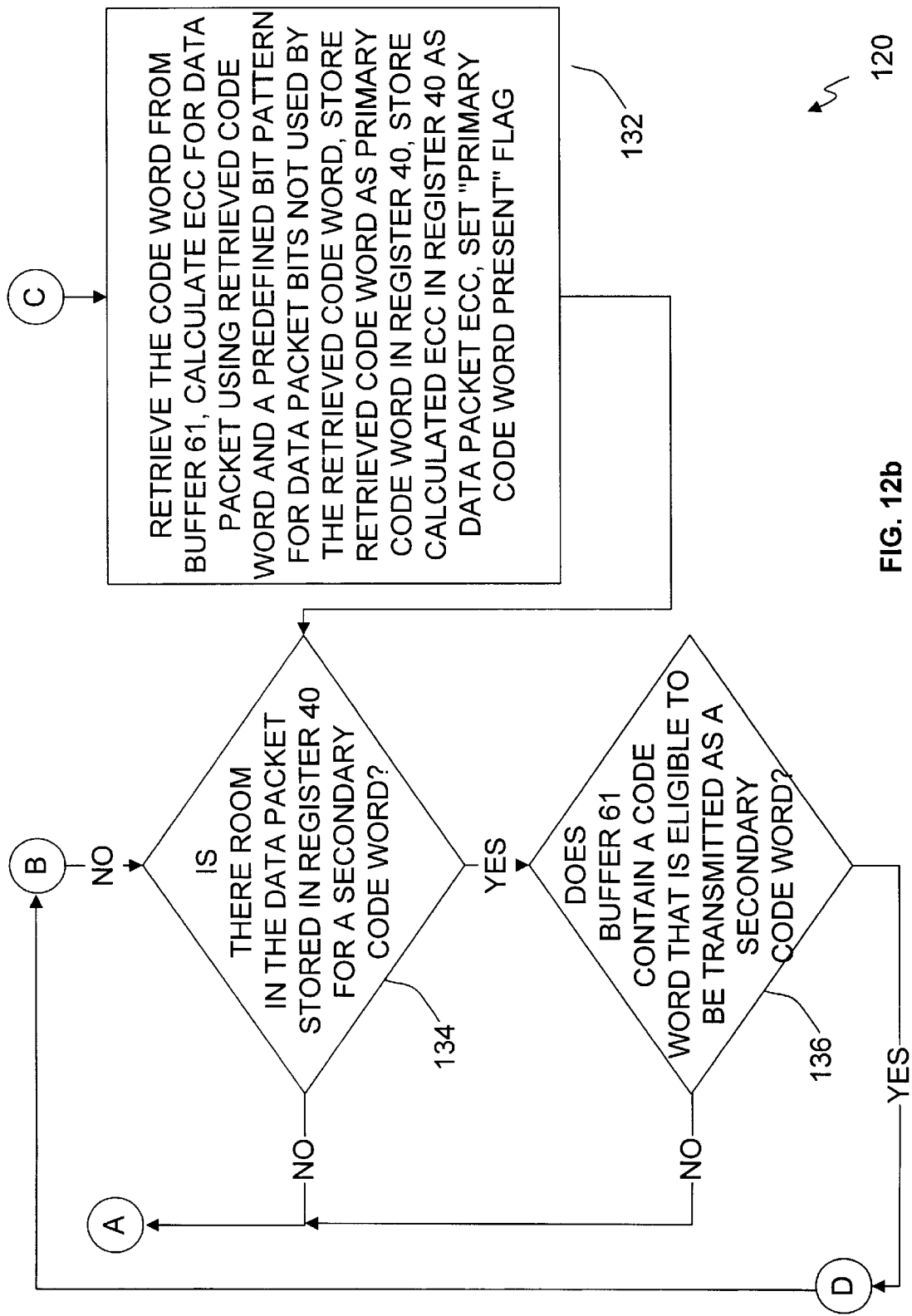
Figure 12C:
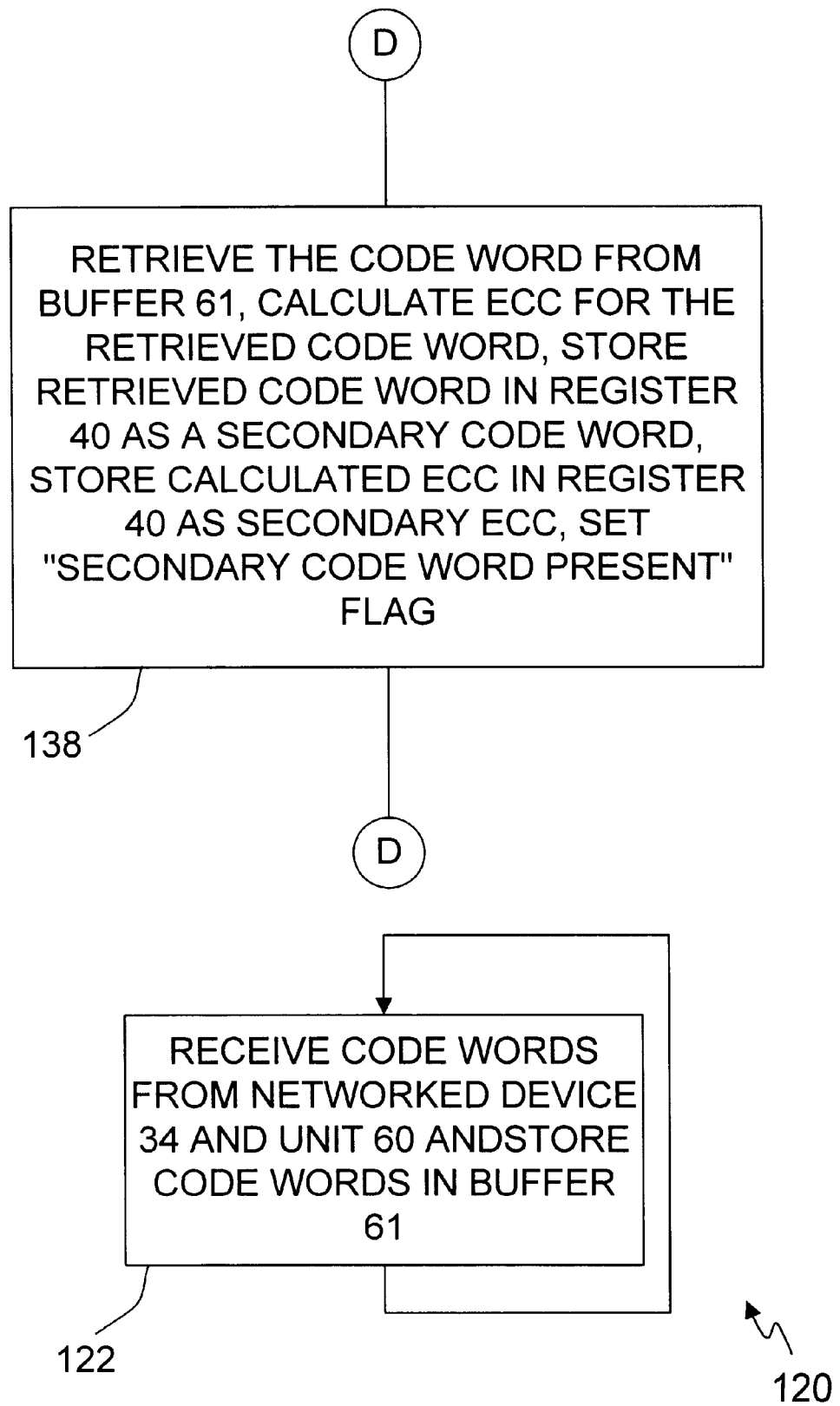

FIG. 12a–12c, taken collectively, show a flow chart 120 that shows the functions performed by outbound code word processing unit 50 of FIG. 6. For the purpose of simplifying the discussion of flow chart 120, it will be assumed that the inbound primary and secondary code word processing units (48 and 52) have performed their functions first. Therefore, if register 40 contained a code word that should be extracted at this node, it will be removed and output code word processing unit 50 will detect that register 40 may accept another code word of the same type (primary or secondary). By making this assumption, a network node may send and receive both primary and secondary packets during the same network clock cycle by simply determining whether register 40 contains code words. One skilled in the art would be able to recast the teachings disclosed herein to combine the individual flow charts shown in FIGS. 8–12c into a single flow chart that can send and receive code words in a single network clock cycle in a more simultaneous manner.

In FIG. 12c, block 122 is a separate component that receives code words from device 34 and secondary code word ECC verification unit 60 of inbound secondary code word processing unit 52 and stores them in buffer 61 of code word output buffer and scheduler unit 62. As described above, a code word may be received from unit 60 if the secondary code word was extracted at this node but not addressed to this node.

Block 124 waits for the next network clock cycle to transfer a data packet into register 40. When the next packet arrives in register 40, control is transferred to decision block 126. Decision block 126 determines whether register 40 contains a primary code word. If it does, the "YES" branch is taken to decision block 134. If register 40 does not contain a primary code word, the "NO" branch is taken to decision block 130. Block 130 determines whether buffer 61 of unit 62 contains a code word that is eligible to be transmitted as a primary code word. When implementing the present invention, it might be desirable to allow certain code words to be transmitted as either a primary or secondary code word. A secondary code word would generally not be transmitted without being piggy-backed onto a primary code word. Therefore, if register 40 is empty and the only code word in the buffer is a code word that can be transmitted as a secondary code word, it may be desirable to transmit that code word as a primary code word. On the other hand, it might be desirable to not allow certain code words to be transmitted as primary code words, which would leave the data packet available for the next node to transmit a primary packet during the next network clock cycle.

If buffer 61 does not contain a contain a code word eligible to be transmitted as a primary code word, the "NO" branch is taken to block 124 and a primary code word is not transmitted. If buffer 61 does contain a code word eligible to be transmitted as a primary code word, the "YES" branch is taken to block 132. Block 132 retrieves the code word from buffer 61, calculates the ECC for the data packet based on the primary code word and a predefined bit pattern (such as all 0's) for data bits not used by the primary code word, stores the retrieved code word as a primary code word in register 40, stores the calculated ECC into the bit positions of register 40 reserved for the data packet ECC, and sets the "primary code word present" flag.

At this point, control passes to decision block 134. Block 134 is reached when register 40 contains a primary packet. If the primary packet is from this node, then block 134 is reached from block 132. If the packet is from another node, then block 134 is reached from the "YES" branch of 126. As discussed above, any code words addressed to this node would have been removed before decision blocks 126 and 134 are initially executed.

Decision block 134 determines whether there is room to piggy-back a secondary code word onto the data packet stored in register 40. As discussed above, if the primary code word is a data code word, there may not be room in the packet for a secondary code word. If the primary code word in the packet is a header code word, there may be room to piggy-back a secondary code word. If there is not room in the code word, the "NO" branch is taken back to block 124. If there is room in the code word, the "YES" branch is taken to decision block 136.

Block 136 determines whether buffer 61 in unit 62 contains a code word that is eligible to be transmitted as a secondary code word. In some protocols, it may be possible to define sub classes of code words based on size. For example, consider a protocol that defines 8-bit code words, 16-bit code words, 40-bit code words, and 50-bit code words. If register 40 (which is 64-bits wide) contains a 50-bit code word stored as a primary code word, then register 40 can accept a 8-bit code word as a secondary code word, but not a 16-bit code word. If register 40 contains a 40-bit code word, either an 8-bit or 16-bit code word can be stored in register 40 as a secondary code word. In addition, for a code word to be eligible to be transmitted as a secondary code word, the route traveled by the data packet as the packet is routed to the network node addressed by the primary code word must also pass through (or end at) the network node addressed by the secondary code word, or must pass through (or end at) a network node that can relay the secondary code word to the network node addressed by the secondary code word.

If buffer 61 does not contain a code word that is eligible to be transmitted as a secondary code word, the "NO" branch is taken to block 124. If buffer 61 does contain a code word that is eligible to be transmitted as a secondary code word, the "YES" branch is taken to block 138. Block 138 retrieves the code word from buffer 61, calculates the ECC for the secondary code word based on the retrieved code word, stores the retrieved code word in register 40 as a secondary code word, stores the calculated ECC in register 40 as a secondary ECC, and sets the "secondary code word present" flag. Control then passes back to decision block 134, which determines whether register 40 may accept a second secondary packet. This process repeats until there is no room in register 40 to accept any packets stored in buffer 61 as secondary packets.

In the flow chart shown in FIG. 12a–12c, block 138 is implemented by secondary code word ECC generation unit 66, block 132 is implemented by primary code word ECC generation unit 64, and the other blocks are implemented by code word output buffer and scheduler unit 62.

The discussion above describes the first embodiment of the present invention. In the first embodiment, the ECC associated with the data packet is calculated by using a predefined bit pattern for all bits of the data packet that are not used by the primary code word. Accordingly, the data packet ECC is only calculated when the primary code word is stored in the data packet. In the second embodiment of the present invention, the data packet ECC is recalculated when a secondary code word is stored in the data packet.

Assume that in accordance with the second embodiment of the present invention, a primary code word is to be transmitted from node 18 to node 24 in FIG. 1, while a secondary code word is to be transmitted from node 20 to node 22 by piggy-backing the secondary code word into the same data packet as the primary code word. When node 18 seeks to send a code word, such as header code word 44 in FIG. 4, the networked device 34 of node 18 transmits the code word to code word output buffer and scheduler unit 62 of outbound code word processing unit 50 of packet processing unit 38. The code word is stored in buffer 61 of unit 62. Code word output buffer and scheduler unit 62 monitors transfer register 40 and determines when register 40 is able to accept a code word by waiting for a data packet that has its "primary code word present" flag cleared. When an available data packet is identified, primary code word ECC generation unit 64 generates the ECC code that protects all bit positions in the data packet, and the code word and ECC are stored in the data packet in transfer register 40.

The next network clock cycle will transfer the contents of transfer register 40 of node 18 to transfer register 40 of node 20. Node 20 is seeking to transmit a code word (such as an acknowledge code word) that may be transmitted as a secondary code word. The code word is transferred from networked device 34 to buffer 61 of code word output buffer and scheduler unit 62. Unit 62 monitors transfer register 40 and detects that register 40 contains a primary code that does not use all bits available in the data packet, and does not contain a secondary code word. After unit 62 has determined that the code word may be piggy-backed into the data packet in register 40 as a secondary code word, unit 62 transfers the code word to secondary code word to ECC generation unit 66.

Since piggy-backing the secondary code word into register 40 will change some the values of some bit positions of the data packet, unit 66 recalculates the data packet ECC and stores the recalculated ECC in register 40, thereby protecting both the primary and secondary code words. However, before the old ECC is lost, unit 66 must verify the contents of register 40 (as the contents arrived at node 20) based on the old data packet ECC to ensure that the data packet was not corrupted before arriving in register 40.

If one of the data bits in the secondary code word is used as a "secondary code word present" flag, it may be advantageous to recalculate the ECC with this bit cleared, even though the bit will actually be set in the register 40. By calculating the ECC in this manner, it may be possible to avoid having to recalculate the ECC later, as will be described in greater detail below.

Figure 13:
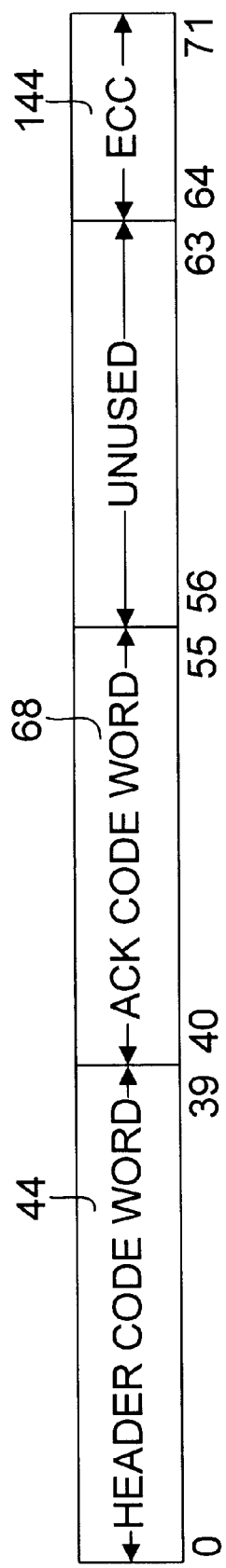
FIG. 13 shows the contents of a transfer register after primary and secondary code words and a recalculated ECC have been stored in the transfer register 40 in accordance with a second embodiment of the present invention.

FIG. 13 shows the contents of register 40 after primary and secondary code words and a recalculated ECC have been stored in register 40 in accordance with the second embodiment of the present invention. As in FIG. 7, header code word 44 is the primary code word and is stored in bit positions 0–39, and acknowledge code word 68 is the secondary code word and is stored in bit positions 40–55. However, while the first embodiment of the present invention provides for primary and secondary ECCs, the second embodiment of the present invention uses the single ECC 144 stored in bit positions 64–71. ECC 144 protects the primary and all secondary code words.

At the next network clock cycle, the contents of register 40 of node 20 will transfer to register 40 of node 22. Node 22 is not sending data and the secondary code word in register 40 is addressed to node 22. Primary code word address decode unit 56 examines the data packet stored in register 40 and determines that register 40 does not contain a primary code word is addressed to node 22. Secondary code word address decode unit 58 examines the data packet stored in register 40 and determines that register 40 contains a primary code word, and therefore may also contain a piggy-backed secondary code word. Unit 58 then determines that register 40 contains a secondary code word addressed to node 22, and extracts the data packet from register 40. ECC verification unit 60 verifies the integrity of the secondary code word by calculating the ECC for the whole data packet and comparing the calculated ECC to the ECC retrieved from register 40. Unit 60 then sends the secondary code word to networked device 34.

If node 22 also sends at least one secondary code word, ECC 144 is recalculated to protect both the primary and all secondary code words. However, if the node 22 does not send a secondary code word, it is necessary to clear the "secondary code word present" flag to indicate that the data packet can accept another secondary code word. Since the ECC was generated with the flag cleared, the ECC still protects the primary code word, provided that the value of the bit positions used to store the secondary code word are not changed. Of course, it is also possible to clear all bit position when the secondary code word is removed, and then recalculate the ECC, in which case it would not have been necessary to calculate the ECC with the "secondary code word present" flag cleared when the secondary code word was initially piggy-backed onto the primary code word at node 20.

At the next network clock cycle, the data packet is transferred to register 40 of node 24. Primary code word address decode unit 56 determines that the packet in register 40 contains a primary code word addressed to node 24. Unit 56 extracts the primary code word and data packet ECC 144, and primary code word verification unit 54 verifies the integrity of the primary code word by calculating the ECC for all bit positions of the data packet and comparing the calculated ECC to the ECC retrieved from register 40. The primary code word is then transmitted to networked device 24.

Had the data packet arrived at node 24 with both a primary and secondary code word, and the ECC had been generated with the assumption that the "secondary code word present" flag was cleared, secondary packet address decode unit 58 can be configured to analyze the secondary code word first, and then clear the "secondary code word present" flag. Accordingly, when primary code word verification unit 54 processes the ECC, it will correspond to the contents of the data packet. Since a secondary packet can never travel farther than the primary packet to which it is piggy-backed, by processing the secondary packet first the "secondary code word present" flag will always be clear when the primary packet is processed. Of course, it would also be possible for one skilled in the art to add additional logic that recognizes when both primary and secondary packets are addressed to the same node, in which case the data packet need only be verified once.

The first embodiment of the present invention was described with reference to the flow charts shown in FIGS. 8–12c. Since the primary difference between the first and second embodiments is the way in which ECC code is used to protect the code words, the second embodiment will also be described with reference to FIGS. 8–12c, and by pointing out the differences between the between the two embodiments.

As discussed above, in the second embodiment it may be desirable to first extract the secondary packet, then extract the primary packet. Flow chart 96 of FIG. 10 shows the functions performed by secondary code word address decode unit 58 for the first embodiment of the invention. To adapt flow chart 96 to function in accordance with the second embodiment, block 104 must extract the complete data packet and data packet ECC from register 40, and block 104 must transmit the complete data packet and data packet ECC to secondary code word verification unit 60.

Flow chart 108 of FIG. 11 shows the functions performed by secondary code word ECC verification unit 60 for the first embodiment of the invention. To adapt flow chart 108 to function in accordance with the second embodiment, block 110 must receive the complete data packet and data packet ECC from unit 106 in FIG. 10. Block 112, must validate the integrity of the secondary code word by calculating the ECC for the entire data packet and comparing the calculated ECC to the data packet ECC. As described above, it may be desirable to calculate the data packet ECC with the "secondary code word present" flag cleared.

Flow chart 74 of FIG. 8 shows the functions performed by primary code word address decode unit 56 for the first embodiment of the invention. To adapt flow chart 74 to function in accordance with the second embodiment, block 80 must extract the complete data packet and data packet ECC from register 40, and block 82 must transmit the complete data packet and data packet ECC to primary code word verification unit 54.

Flow chart 84 of FIG. 9 shows the functions performed by primary code word ECC verification unit 54 for the first embodiment of the invention. To adapt flow chart 84 to function in accordance with the second embodiment, block 86 must receive the complete data packet and data packet ECC from block 82 in FIG. 8. Block 88, must validate the integrity of the primary code word by calculating the ECC for the entire data packet and comparing the calculated ECC to the data packet ECC. In contrast to the first embodiment, wherein a predefined bit pattern was used to calculate the ECC for bit positions not used by the primary code word, in the second embodiment the ECC is calculated using all bits from the data packet.

Flow chart 120 of FIG. 12a–12c shows the functions performed by outbound code word processing unit 50 in FIG. 6. To adapt flow chart 120 to function in accordance with the second embodiment, block 138 must be modified to recalculate the data packet ECC based in the primary and all secondary code words, and then store the recalculated ECC into register 40. As discussed above, it may be desirable to calculate the ECC with all "secondary code word present" flag cleared. In addition, before recalculating the ECC, the old ECC must be verified to ensure that an error in the primary code word is not "covered up" by the recalculated ECC.

In FIG. 6 and in the flowcharts shown in FIGS. 8–12c, the function of decoding a code word address and determining whether a code word is addressed to a particular node is performed before the verification of the code words. Those skilled in the art will recognize that it may be advantageous to verify the integrity of the code word first to ensure that the addresses contained therein have not been corrupted.

While the present invention has been described primarily with respect to ECC codes, such as a SEC-DED Hamming code, those skilled in the art will recognize that the present invention may be used with other codes that protect the integrity of data, such as parity codes or any other appropriate error detection or correction codes.

In the example discussed above, a secondary code word was piggy-backed onto a primary code word. However, the invention is not limited to piggy-backing a single secondary code word. If a packet already contains a primary and a secondary code word, yet contains enough unused bit positions to accept another secondary code word, a second secondary code word may be piggy-backed onto the primary and (first) secondary code words using the teachings disclosed herein. The primary factor limiting the number of secondary code words that may be piggy-backed into a data packet is the number of unused bit positions in the packet.

Whether it may be desirable for a particular node to extract a secondary code word that is not addressed to that node is dependant on several factors. First, extracting the secondary code word at a node not addressed by the secondary code word may be required based on the topology. For example, in a star topology, where a plurality of satellite nodes communicate via a central node, a first satellite would transmit a secondary code word to the central node, and the central node would then relay the secondary code word onto the node addressed by the secondary code word.

Second, extracting the secondary code word before its destination may be necessary if the data packet has reached the node addressed by the primary packet. Third, if a primary code word is corrupt, but a secondary code word is not, it may be desirable to extract the secondary code word prematurely, and retransmit the secondary code word. Finally, it may be desirable to extract and receive or retransmit secondary code words at each node. By continually receiving secondary code words, and placing code words not addressed to the node in buffer 61 (shown in FIG. 6), it is possible to achieve a higher level of scheduling efficiency and packing in the data packet. Extracting and rescheduling secondary code words also provides opportunities to assign priorities to different types of code words, thereby allowing higher priority code words to be transmitted first, while allowing lower priority code words to move close to their ultimate destination as unused packet space permits.

Each embodiment of the present invention has unique advantages. In the first embodiment, the primary data packet ECC does not need to be recalculated. Therefore, an implementation of the first embodiment should be faster than an implementation of the second embodiment. Further, it is within the scope of the present invention to calculate the secondary ECC before the data packet arrives. Accordingly, when a data packet that has room for a secondary packet arrives in register 40, the secondary code word and secondary ECC can immediately be stored in register 40. In contrast, the second embodiment of the invention requires that the old ECC be verified, and a new ECC be calculated and stored in register 40. None of this can occur until the data packet arrives in register 40. Therefore, in the second embodiment, the network clock cycle must be slow enough to allow these functions to be performed, or additional register stages must be added, thereby increasing latency.

The primary advantage of the second embodiment of the invention is that it is more space efficient. Since the data packet ECC protects both the primary and secondary code words, it is not necessary to provide secondary ECCs. Accordingly, bit positions that would be used by secondary ECCs in the first embodiment may be used by either primary or secondary code words in the second embodiment.

While the present invention may be implemented in any networked system, it is especially advantageous when employed in a multi-processor computer system. In such a system, the network protocols tend to be designed specifically for the computer system, and therefore it is convenient to define the primary and secondary code word types within the framework of the protocol. In addition, in a multi-processor computer system, there is a constant stream of data flowing between processors, which provides many opportunities to piggy-back secondary code words onto a primary code word. In one multi-processor protocol allowing the transmission of secondary code words in accordance with the present invention, header and data code words travel as primary code words, and acknowledge code words travel as secondary code words. Since every header code word eventually results in an acknowledge code word, there tends to be a good match between the number of primary code words onto which a secondary code word may be piggy-backed, and the number of secondary code words.

Figure 14:
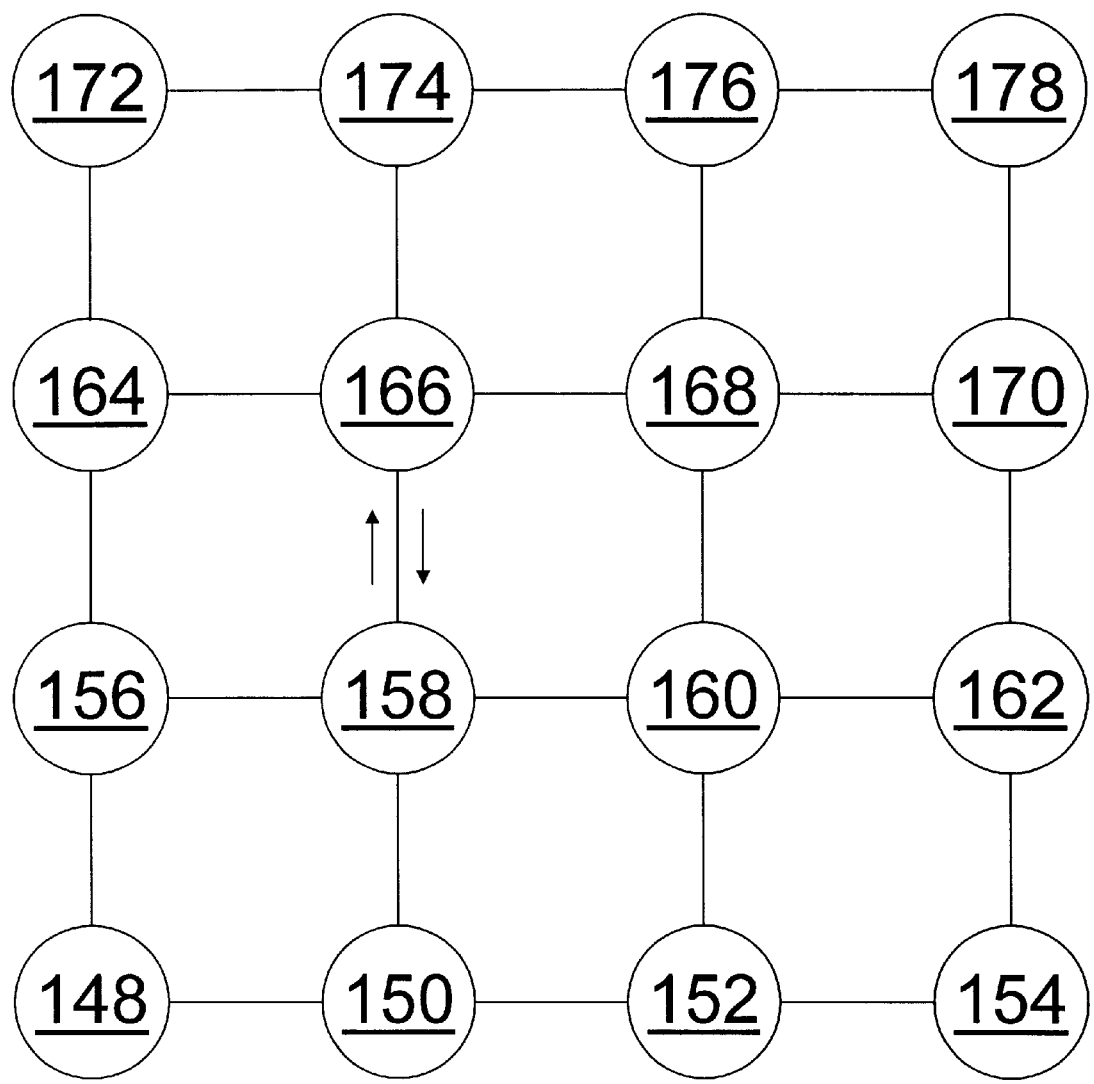
FIG. 14 shows a mesh computer system having sixteen processors.

FIG. 14 shows a mesh computer system 146 having processors 148, 150, 152, 154, 156, 158, 160, 162, 164, 166, 168, 170, 172, 174, 176, and 178. Each processor as linked to an adjacent processor by a two way network segment. In accordance with the present invention, if processor 158 sends a primary packet to processor 170, and the primary packet will be routed via processors 160 and 162, then processor 160 may send a secondary packet to processor 170. Of course, the implementation of present invention in mesh computer 146 will be more complex than in networked system 10 of FIG. 1. For example, a node sending a secondary packet must be able to determine the route of the primary packet. However, those skilled in the art will be able to adapt the teachings disclosed herein to more complex system, such as mesh computer system 10.

In summary, the present invention increases network bandwidth by using space that was previously wasted. In the prior art, each code word traveled in a separate data packet. In accordance with the present invention, each code word that can be piggy-backed as a secondary code word frees up a packet to carry other data. In the first embodiment, the data packet ECC protecting the primary code word is not disturbed by the secondary code word, which minimizes the time spent piggy-backing the secondary code word onto the primary code word. In the secondary embodiment of the present invention, the data packet ECC protects both the primary and secondary code word, which eliminates the need for a secondary ECC, and thereby maximizes the space in the data packet available for the primary and secondary code words.

Although the present invention has been described with reference to preferred embodiments, workers skilled in the art will recognize that changes may be made in form and detail without departing from the spirit and scope of the invention.

What is claimed is:

1. A method of transmitting data between nodes in a packet-based communication system comprising:

recognizing at a first node that a primary code word in a data packet does not use all bit positions provided by the data packet;

identifying at the first node a code word addressed to a second node and eligible to be transmitted as a secondary code word;

storing at the first node the code word as the secondary code word in the bit positions of the data packet not used by the primary code word;

transmitting the data packet to the second node;

recognizing at the second node that the secondary code word contained in the data packet is addressed to the second node; and extracting at the second node the secondary code word from the data packet.

2. The method of claim 1 and further comprising:

recognizing at a third node that the data packet may accept the primary code word;

storing at the third node the primary code word into the data packet; and transmitting the data packet to the first node.

3. The method of claim 2 and further comprising:

calculating at the third node a primary error correcting code based on the primary code word; and storing at the third node the primary error correcting code into the data packet.

4. The method of claim 3 wherein calculating at the third node a primary error correcting code based on the primary code word comprises calculating the primary error correcting code using the primary code word and a fixed bit pattern for bit positions of the data packet not occupied by the primary code word.

5. The method of claim 4 and further comprising:

transmitting the data packet to a fourth node;

recognizing at the fourth node that the primary code word contained in the data packet is addressed to the fourth node;

extracting at the fourth node the primary code word and the primary error correcting code; and validating the primary code word by calculating a calculated error correcting code based on the primary code word and the fixed bit pattern and comparing the calculated error correcting code to the primary error correcting code.

6. The method of claim 3 and further comprising:

calculating at the first node a combined error correcting code based on the primary and secondary code words; and replacing at the first node the error correcting code in the data packet with the combined error correcting code.

7. The method of claim 6 and further comprising:

verifying at the first node the primary code word by calculating a calculated error correcting code based on contents of the data packet and comparing the calculated error correcting code with the error correcting code stored in the data packet.

8. The method of claim 6 and further comprising:

verifying at the second node the secondary code word by calculating a calculated error correcting code based on contents of the data packet and comparing the calculated error correcting code with the error correcting code stored in the data packet.

9. The method of claim 6 and further comprising:

verifying at the fourth node the primary code word by calculating a calculated error correcting code based on contents of the data packet and comparing the calculated error correcting code with the error correcting code stored in the data packet.

10. The method of claims 1 and further comprising:

calculating at the first node a secondary error correcting code based on the secondary code word;

storing at the first node the secondary error correcting in the data packet;

extracting at the second node the secondary error correcting code; and validating the secondary code word by calculating a calculated error correcting code based on the secondary code word and comparing the calculated error correcting code to the primary error correcting code.

11. The method of claim 1 wherein a code word addressed to a second node is eligible to be transmitted as a secondary code word if a route traveled by the data packet as the data packet is routed to a node addressed by the primary code word passes through or ends at the second node.

12. The method of claim 1 wherein a code word addressed to a second node is eligible to be transmitted as a secondary code word if a route traveled by the data packet as the data packet is routed to a node addressed by the primary code word passes through or ends at a node that can relay the code word to the second node.

13. A network node comprising:

a networked device; and a network interface coupled to the networked device, the network interface comprising:

a transfer memory region which holds a data packet and is coupled to network media; and a packet processing unit coupled to the transfer memory region and the networked device, the packet processing unit comprising:

an inbound primary code word processing unit for transmitting primary code words addressed to the network node from the transfer memory region to the networked device, wherein the inbound primary code word processing unit includes a primary code word verification unit for verifying integrity of inbound primary code words;

an outbound code word processing unit for receiving outbound code words from the networked device and storing the outbound code words in the transfer memory region as primary and secondary code words, wherein the outbound code word processing unit includes a primary code word error code generating unit and a secondary code word error code generating unit; and an inbound secondary code word processing unit for transmitting secondary code words addressed to the network node and stored in data packets that also contain a primary code word from the transfer memory region to the networked devices wherein the inbound secondary code word processing unit includes a secondary code word verification unit for verifying integrity of inbound secondary code words.

14. The network node of claim 13 wherein the primary code word error code generating unit generates a data packet error code using the primary code word and a fixed bit pattern for bit positions in the data packet not used by the primary code word, and the primary code word verification unit verifies integrity of inbound primary code words by calculating a calculated error code based on the primary code word and using the fixed bit pattern for the bit position in the data packet not used by the primary code word, and comparing the calculated error code with the data packet error code.

15. The network node of claim 13 wherein the secondary code word error code generating unit generates a secondary error code using the secondary code word, and the secondary code word verification unit verifies integrity of inbound secondary code words by calculating a calculated error code based on the secondary code word, and comparing the calculated error code with the secondary error code.

16. The network node of claim 13 wherein the secondary code word error code generating unit verifies integrity of the primary code word by calculating a first calculated error code based on the data packet and comparing the first calculated error code to the data packet error code, and generates a recalculated error code based on the data packet after the secondary code word has been stored in the data packet, and the secondary code word verification unit verifies integrity of inbound secondary code words by calculating a second calculated error code based on the data packet, and comparing the second calculated error code with the data packet error code.

17. A packet-based communication system comprising:

network media; and a plurality of network nodes coupled together by the network media, wherein the plurality of network nodes communicate with each other by exchanging data packets that comprise a plurality of bit positions, with each data packet capable of carrying a primary code word stored in a first portion of the plurality of bit positions, a secondary code word stored in a second portion of the plurality of bit positions, and a data packet error code stored in a third portion of the plurality of bit positions, wherein the data packet error code is calculated based on the primary code word and a fixed bit pattern used in place of bit positions of the plurality of bit positions that are not used by the first portion.

18. The packet-based communication system of claim 17 wherein the data packet error code is calculated based on the primary and secondary code words.

19. A packet-based communication system comprising:

network media; and a plurality of network nodes coupled together by the network media, wherein the plurality of network nodes communicate with each other by exchanging data packets that comprise a plurality of bit positions with each data packet capable of carrying a primary code word stored in a first portion of the plurality of bit positions and a secondary code word stored in a second portion of the plurality of bit positions, wherein each data packet further includes a secondary error code based on the secondary code word and stored in a third portion of the plurality of bit positions.

* * * * *